Patented Sept. 15, 1953

2,652,349

UNITED STATES PATENT OFFICE 2,652,349

INTERLINING FOR THE MANUFACTURE OF CHEMICALLY STIFFENED ARTICLES OF WEARING APPAREL

Lajos Bihaly, London, England, assignor to Industrial Accountancy Partnership Limited, London, England, a firm No Drawing. Application May 23, 1950, Serial No. 163,794. In Great Britain May 30, 1949

2 Claims. (Cl. 117—139.4)

This invention relates to an interlining of the manufacture of chemically stiffened articles of wearing apparel, especially washable wearing apparel, and it forms a further improvement of the invention according to the British Patent No. 419,208. The interlinings used in accordance with said patent consist of textile fabric which includes, in addition to yarns of cotton or other non-thermoplastic textile fibre, yarns which can be made temporarily adhesive under the influence of heat and/or solvents, e. g. yarns of cellulose acetate.

The interlinings now generally used are of loose weave and soft handle and are thus liable to be stretched or distorted during the operation of assembling together the interlining and the inert face plies with which it is to be united. Any such distortion of the interlining may cause wrinkling of the face plies or misshaping of the finished article, so that a stiffer interlining, less liable to distortion, would offer substantial manufacturing advantages. However, it has been found that the treatment of the interlining with any of the stiffening or dressing agents normally employed for textiles seriously interferes with the adhesive properties of the interlining, the strength of adhesion obtained in the finished article being in most cases reduced to about one half or less of that obtained with the untreated interlining.

The present invention provides an interlining for chemically stiffened articles of wearing apparel, especially washable wearing apparel which is characterized by being stiffer than the usual interlining of loose weave and soft handle, without losing any of its adhesive capacity or any of its strength of adhesion with the inert face plies. The interlining according to this invention is impregnated with a thermoplastic resin with a softening point between 50 and 130° C., the amount of thermoplastic resin in and on the interlining being equal to about 2–5% of the weight of the interlining. From the great number of thermoplastic resins the expert will be able to choose such as will cause a stiffening of the interlining without, however, impairing its adhesive properties. The thermoplastic resins are usually applied in the form of an aqueous dispersion; some examples of suitable impregnating compositions are:

1. Aqueous anionic dispersion of β-ethoxyethyl methacrylate polymer, for example the dispersion known under the registered trade-mark "Calatac MC" (owned by Imperial Chemical Industries Ltd.), having a softening point of 50° C.

2. Positively charged aqueous dispersion of methyl methacrylate polymer, for example the dispersion known under the registered trade-mark "Calatac MMP" (owned by Imperial Chemical Industries Ltd.), softening at 125° C.

3. Aqueous dispersion of the co-polymer of ethyl acrylate and styrene, for example the dispersion known under the registered trade-mark "Texisize" (owned by Scott Boder & Co. Ltd.), having a softening point of 105° C.

4. Aqueous dispersion of a thermoplastic resin similar to that defined under 3, which, however, has a lower ratio of styrene to ethyl acrylate and a softening point at 60° C.

In the preparation defined under 2 ("Calatac MMP") the positively charged aqueous dispersion as marketed contains approximately 17% of solid methyl methacrylate polymer. For impregnating the interlining a 10% solution of the dispersion as marketed was found most satisfactory. The pH value of the impregnation solution should be preferably within the range of 5.6–6.0, adjustment being made if necessary by the addition of small quantities of a dilute solution of acetic acid. To find out whether this is necessary, a test of diluting the dispersion with water should be made beforehand, and then the required amount of dilute acetic acid should be added to the water used for dilution prior to the addition of the dispersion of the methyl methacrylate polymer.

The stability of Calatac MMP is adversely affected by anionic substances such as soap, sulfated fatty alcohols, wetting agents of the anion-active class and sulfonated oils. If the interlining material to be stiffened contains any residue of such an anionic substance, it should be pretreated for the removal of that substance; a suitable pretreatment consists in working the material for ten minutes at 50° C. in a bath containing per 100 liter approximately 250 g. of the cleaning agent known under the registered trade-mark "Dispersol VL" (owned by Imperial Chemical Industries Ltd.); in this pretreatment the liquor to goods ratio should be preferably about 50 to 1. After this pretreatment, the material is thoroughly rinsed and hydroextracted, but it need not be dried before applying the Calatac MMP. Such a pretreatment will make it possible to obtain an even and fine distribution of the Calatac MMP whereas if the pretreatment is omitted said impregnation agent will tend to form deposits on the interlining in a coarsely aggregated form.

For impregnation with Calatac MMP the cellulose acetate containing interlining material, after being pretreated if necessary, is worked in the Calatac MMP-containing bath at 40° C. for ten minutes, the ratio of liquor to goods being preferably 30 to 1. The temperature is then raised to 50° C. and the material worked for further 20 minutes at this temperature. The material is then withdrawn from the bath, lightly rinsed in tepid water at 20° C. and hydroextracted, after which it is trimmed and finished in the usual way.

There are many ways of varying the above described impregnation of the interlining material by means of thermoplastic resins (as Calatac MMP in the above example). The simplest thing will be to submit the woven material to the conventional methods of finishing, consisting in desizing, scouring, bleaching and drying. Thereafter the fabric is padded at room temperature in a padding mangle in an aqueous dispersion of any of the beforementioned polymers or of polymers of a similar nature, the concentration of the polymer in the treating solution preferably being such as to result in a deposition of 2–5%, preferably 3%, solid polymer of the dry weight of the fabric.

After this process, the fabric is dried and, if required, preshrunk following the usual practice.

The steps and details used in the application of dispersions of thermoplastic resins other than Calatac MMP are substantially similar to those described in the above example illustrating the application of the Calatac MMP dispersion.

The interlining material obtained according to the present invention has a degree of stiffness which greatly facilitates the operations of making up the multi-ply assembly prior to fusing. If the treated material has some tendency to adhere to the needle of the sewing machine used for stitching it to the other plies of the assembly, the interlining should be arranged lowermost, instead of uppermost as is now usual in the sewing operation uniting it with the other fabric layers. In all other respects the interlining and the assembly containing it are treated precisely in accordance with existing practice. The strength of adhesion is equal to, or only slightly less than, that obtained with the unstiffened interlining.

It will be understood by those skilled in the art that the process of my invention is not limited to the above described materials, steps and details and may be carried out with various modifications without departing from the scope of the invention as defined in the appended claims.

The term "thermoplastic resin" used in the present specification and claims to include all substantially stable thermoplastic resins which have no adverse effect on conventional non-thermoplastic textile materials, such as cotton, and on thermoplastic textile materials, such as cellulose acetate, and have no undesired properties, such as smell and/or irritating effect on the wearer in the use as wearing apparel of textile products.

The dispersions of such resins are prepared either mechanically from solid polymers or preferably by emulsion polymerization of the monomer or the monomers to be co-polymerized.

The cleaning agent or detergent used in the above described pre-treatment and known in the trade under the name "Dispersol VL" is an aqueous solution of a fatty alcohol ethylene oxyde condensation product. Instead of this agent other cleaning agents having an equivalent effect may also be used.

What is claimed is:

1. Interlining for chemically stiffened articles of wearing apparel, which, in addition to cotton fibers contains fibrous cellulose acetate material spaced at intervals in open mesh arrangement in the interlining, said interlining being impregnated with 2–5% of a co-polymer of ethyl acrylate and styrene, having a softening point of between about 50° and 130° C., without affecting its adhesive properties, in order to stiffen the interlining.

2. Interlining, as claimed in claim 1, in which the co-polymer of ethyl acrylate and styrene has a softening point of 60°–105° C.

LAJOS BIHALY.

References Cited in the file of this patent

UNITED STATES PATENTS

| Number | Name | Date |
| --- | --- | --- |
| 1,933,052 | Fikenscher | Oct. 31, 1933 |
| 2,040,819 | Bebie et al. | May 19, 1936 |
| 2,046,885 | Strain | July 7, 1936 |
| 2,167,234 | Dreyfus | July 25, 1939 |
| 2,218,387 | Swan et al. | Oct. 15, 1940 |
| 2,295,699 | Thackston | Sept. 15, 1942 |
| 2,343,095 | Smith | Feb. 29, 1944 |
| 2,449,534 | Meyer | Sept. 14, 1948 |